(12) United States Patent
Rossi

(10) Patent No.: US 11,138,183 B2
(45) Date of Patent: *Oct. 5, 2021

(54) AGGREGATING DATA IN A MEDIATION SYSTEM

(71) Applicant: Ab Initio Technology LLC, Lexington, MA (US)

(72) Inventor: Larry Paul Rossi, Colorado Springs, CO (US)

(73) Assignee: Ab Initio Technology LLC, Lexington, MA (US)

(*) Notice: Subject to any disclaimer, the term of this patent is extended or adjusted under 35 U.S.C. 154(b) by 760 days.

This patent is subject to a terminal disclaimer.

(21) Appl. No.: 14/879,356

(22) Filed: Oct. 9, 2015

(65) Prior Publication Data

US 2016/0034522 A1 Feb. 4, 2016

Related U.S. Application Data

(63) Continuation of application No. 13/565,321, filed on Aug. 2, 2012, now Pat. No. 9,185,235.

(51) Int. Cl.
*G06F 16/23* (2019.01)
*G06F 11/30* (2006.01)
(Continued)

(52) U.S. Cl.
CPC ...... *G06F 16/2365* (2019.01); *G06F 11/3082* (2013.01); *G06F 16/2228* (2019.01);
(Continued)

(58) Field of Classification Search
CPC .......... G06F 17/30371; G06F 11/3082; G06F 16/23; G06F 16/2228; G06F 16/24575; H04M 15/41; H04M 15/44; H04M 15/53
(Continued)

(56) References Cited

U.S. PATENT DOCUMENTS

| 5,511,190 A | 4/1996 | Sharma et al. |
| 6,654,907 B2 | 11/2003 | Stanfill et al. |

(Continued)

FOREIGN PATENT DOCUMENTS

| CN | 1131859 | 9/1996 |
| CN | 1428985 | 7/2003 |

(Continued)

*Primary Examiner* — Allen S Lin
(74) *Attorney, Agent, or Firm* — Occhiuti & Rohlicek LLP

(57) ABSTRACT

Records received from one or more sources in a network are processed. For each of multiple intervals of time, a matching procedure is attempted on sets of one or more records, including comparing identifiers associated with different records to generate the sets and determining whether or not a completeness criterion is satisfied for one or more of the sets. The processing also includes, for at least some of the intervals of time, processing at least one complete set, consisting of one or more of the received records on which the matching procedure is first attempted during the interval of time and one or more records stored in a data store before the interval of time, and for at least some of the intervals of time, processing at least one incomplete set, consisting of one or more records stored in the data store before the interval of time.

50 Claims, 2 Drawing Sheets

(51) Int. Cl.
*G06F 16/22* (2019.01)
*G06F 16/9535* (2019.01)
*G06F 16/2457* (2019.01)
*H04M 15/00* (2006.01)

(52) U.S. Cl.
CPC .... *G06F 16/24575* (2019.01); *G06F 16/9535* (2019.01); *H04M 15/00* (2013.01); *H04M 15/41* (2013.01); *H04M 15/43* (2013.01); *H04M 15/44* (2013.01); *H04M 15/53* (2013.01); *H04M 15/62* (2013.01)

(58) Field of Classification Search
USPC .......................................................... 707/693
See application file for complete search history.

(56) References Cited

U.S. PATENT DOCUMENTS

| | | | | |
|---|---|---|---|---|
| 7,215,637 | B1 * | 5/2007 | Ferguson | H04L 45/00 370/230.1 |
| 7,272,216 | B2 | 9/2007 | Elias et al. | |
| 7,761,084 | B2 * | 7/2010 | Thistle | G06Q 30/04 455/406 |
| 7,885,932 | B2 * | 2/2011 | Kulkarni | G06F 17/30312 707/640 |
| 8,078,651 | B2 * | 12/2011 | Desai | G06F 17/30315 707/812 |
| 8,463,781 | B1 * | 6/2013 | Raz | G06F 17/30492 707/736 |
| 8,595,267 | B2 * | 11/2013 | Sivasubramanian | G06F 9/5061 707/803 |
| 8,737,953 | B2 * | 5/2014 | Sharma | H04M 15/00 379/126 |
| 2005/0069109 | A1 | 3/2005 | Elias et al. | |
| 2006/0174017 | A1 | 8/2006 | Robertson | |
| 2006/0240850 | A1 * | 10/2006 | Kaplan | H04L 51/38 455/466 |
| 2007/0078856 | A1 * | 4/2007 | Dettinger | G16H 10/60 |
| 2007/0233938 | A1 * | 10/2007 | Cho | G06F 9/4405 711/103 |
| 2008/0200145 | A1 | 8/2008 | Thistle et al. | |
| 2009/0030943 | A1 | 1/2009 | Kall | |
| 2009/0193046 | A1 | 7/2009 | Desai et al. | |
| 2009/0271181 | A1 | 10/2009 | Balegar et al. | |
| 2010/0197266 | A1 | 8/2010 | Raleigh | |
| 2010/0197267 | A1 | 8/2010 | Raleigh | |
| 2010/0198698 | A1 | 8/2010 | Raleigh et al. | |
| 2010/0257077 | A1 | 10/2010 | Cai et al. | |
| 2010/0304710 | A1 | 12/2010 | Sharma et al. | |
| 2012/0047125 | A1 | 2/2012 | Day et al. | |
| 2012/0096513 | A1 | 4/2012 | Raleigh et al. | |
| 2012/0330954 | A1 | 12/2012 | Silvasubramanian et al. | |
| 2013/0067213 | A1 | 3/2013 | Liu | |
| 2013/0117255 | A1 | 5/2013 | Liu | |

FOREIGN PATENT DOCUMENTS

| | | |
|---|---|---|
| CN | 1682520 | 10/2005 |
| CN | 1811774 | 8/2006 |
| WO | 2010/138363 | 12/2010 |
| WO | 2011/134807 | 11/2011 |

* cited by examiner

AGGREGATING DATA IN A MEDIATION SYSTEM

CROSS-REFERENCE TO RELATED APPLICATIONS

This application is a continuation of and claims priority to U.S. application Ser. No. 13/565,321, filed on Aug. 2, 2012, incorporated herein by reference.

BACKGROUND

This description relates to aggregating data in a mediation system.

Aggregation of various kinds of data is performed in some systems to ensure that all the relevant information available from various sources in a network can be used for decision-making and performing certain functions. For example, in a telecommunications network, a billing mediation platform running on a node in the network collects records (e.g., call detail records (CDRs)) from other nodes (e.g., routing nodes or gateway nodes) to determine billing information for a downstream billing system. Processing of the collected records may include aggregation of different records related to the same call. Some records to be aggregated may have been generated by the same node at different times (e.g., a start CDR and a stop CDR corresponding to the start and end of a phone call). Some records to be aggregated may have been generated by different nodes (e.g., a node providing start and stop CDRs and a node providing call quality metric records).

SUMMARY

In one aspect, in general, a method for processing data received at a node in a network includes receiving records from one or more sources in the network. At least some of the records are each associated with an identifier. The method also includes, for each of multiple intervals of time, attempting a matching procedure on sets of one or more records. The matching procedure includes comparing identifiers associated with different records to generate the sets and determining whether or not a completeness criterion is satisfied for one or more of the sets. The method also includes, for at least some of the intervals of time, processing at least one complete set of records, for which the completeness criterion was satisfied during that attempt, consisting of one or more of the received records on which the matching procedure is first attempted during the interval of time and one or more records stored in a data store before the interval of time, and for at least some of the intervals of time, processing at least one incomplete set of records, for which the completeness criterion was not satisfied during that attempt, consisting of one or more records stored in the data store before the interval of time.

Aspects can include one or more of the following features.

The method further includes: after at least some attempts of the matching procedure, storing in the data store at least some incomplete sets of records for which the completeness criterion was not satisfied during that attempt, and storing keys corresponding to the incomplete sets of records in a data structure separate from the data store; and retrieving stored keys from the data structure to attempt the matching procedure on corresponding records during a subsequent interval of time.

Stored keys are retrieved from the data structure asynchronously with the intervals of time.

The method further includes, for at least some of the intervals of time, processing at least one complete set of records, and storing in the data store information identifying the processed complete set of records as having been processed.

The method further includes, for at least some of the intervals of time, processing at least one incomplete set of records, and storing in the data store information identifying the processed incomplete set of records as having been processed.

An incomplete set of records is processed after at least two attempts of the matching procedure in response to comparison of a time associated with at least one record in the incomplete set of records with an expiration criterion.

The expiration criterion depends on a degree of incompleteness of the incomplete set of records.

Comparing identifiers associated with different records to generate the sets and determining whether or not a completeness criterion is satisfied for one or more of the sets of records includes: determining distinct identifiers associated with the received records, for each distinct identifier, retrieving any records stored in the data store associated with that distinct identifier, and aggregating a set of records associated with that identifier that includes one or more of the received records and any retrieved records, and determining whether or not the completeness criterion is satisfied for each aggregated set of records.

Retrieving any records stored in the data store associated with that distinct identifier includes: looking up the distinct identifier in an index associated with the data store.

Retrieving any records stored in the data store associated with that distinct identifier includes: decompressing a portion of the data store that includes any records associated with the distinct identifier.

Retrieving any records stored in the data store associated with that distinct identifier includes: scanning the decompressed portion of the data store to locate any records associated with the distinct identifier.

Retrieving any records stored in the data store associated with that distinct identifier includes: determining whether or not a stored set of records associated with that distinct identifier has been identified as having been processed.

Retrieving any records stored in the data store associated with that distinct identifier includes: determining a hash value based on the distinct identifier.

Receiving records from one or more sources in the network includes storing the received records in an input buffer.

Retrieving stored keys from the data structure to attempt the matching procedure on corresponding records during a subsequent interval of time includes: removing a key from the data structure, and adding the removed key or a record corresponding to the removed key to the input buffer.

The key associated with a set of records includes the identifier associated with the set of records.

The intervals of time are determined based on a clock at the node.

The intervals of time are determined based on a number of records received.

One or more of the intervals of time are included within a checkpoint interval in which data associated with the matching procedure that has been received or generated since a previous checkpoint interval is persistently stored.

The data store enables random access of records stored in the data store.

Processing a set of records includes sending information in the records in the set to another node in the network.

In another aspect, in general, a computer-readable storage medium stores a computer program for processing data received at a node in a network. The computer program includes instructions for causing a computing system to: receive records from one or more sources in the network, at least some of the records each being associated with an identifier; for each of multiple intervals of time, attempt a matching procedure on sets of one or more records, the matching procedure including comparing identifiers associated with different records to generate the sets and determining whether or not a completeness criterion is satisfied for one or more of the sets; for at least some of the intervals of time, process at least one complete set of records, for which the completeness criterion was satisfied during that attempt, consisting of one or more of the received records on which the matching procedure is first attempted during the interval of time and one or more records stored in a data store before the interval of time; and for at least some of the intervals of time, process at least one incomplete set of records, for which the completeness criterion was not satisfied during that attempt, consisting of one or more records stored in the data store before the interval of time.

In another aspect, in general, a network node includes: a network interface configured to receive records from one or more sources in the network, at least some of the records each being associated with an identifier; and at least one processor configured to process sets of records. The processing includes: for each of multiple intervals of time, attempting a matching procedure on sets of one or more records, the matching procedure including comparing identifiers associated with different records to generate the sets and determining whether or not a completeness criterion is satisfied for one or more of the sets; for at least some of the intervals of time, processing at least one complete set of records, for which the completeness criterion was satisfied during that attempt, consisting of one or more of the received records on which the matching procedure is first attempted during the interval of time and one or more records stored in a data store before the interval of time; and for at least some of the intervals of time, processing at least one incomplete set of records, for which the completeness criterion was not satisfied during that attempt, consisting of one or more records stored in the data store before the interval of time.

In another aspect, in general, a network node includes: means for receiving records from one or more sources in the network, at least some of the records each being associated with an identifier; and means for processing sets of records. The processing includes: for each of multiple intervals of time, attempting a matching procedure on sets of one or more records, the matching procedure including comparing identifiers associated with different records to generate the sets and determining whether or not a completeness criterion is satisfied for one or more of the sets; for at least some of the intervals of time, processing at least one complete set of records, for which the completeness criterion was satisfied during that attempt, consisting of one or more of the received records on which the matching procedure is first attempted during the interval of time and one or more records stored in a data store before the interval of time; and for at least some of the intervals of time, processing at least one incomplete set of records, for which the completeness criterion was not satisfied during that attempt, consisting of one or more records stored in the data store before the interval of time.

Aspects can include one or more of the following advantages.

The techniques described herein enable efficient aggregation of data arriving at a node in a network from one or more upstream nodes in the network. The data may include, for example, multiple streams of records that contain information to be delivered to a downstream system. The matching procedure is able to aggregate records of one stream with records of other streams, or aggregate multiple records of the same stream that arrive at different times. A set of records that is complete, according to some completeness criterion, can be processed (e.g., with the records themselves or information associated with the records being delivered to the downstream system). It may be desirable to deliver the information to the downstream system in a manner that provides a trade-off between different criteria. For example, in some implementations the information should be delivered with low latency, and the information that is delivered should be as complete as possible. In order for the information to be as complete as possible, the matching procedure should delay delivery of some records until they can be aggregated with other records that arrive later in time. However, incomplete information that is missing information from some expected records might still need to be delivered after some time limit to satisfy a latency criterion.

The data store storing incomplete sets of records and the data structure storing keys for incomplete sets of records enable an efficient technique for repeating the matching procedure to determine if the completeness criterion is met at a later time. Since later attempts at matching a particular incomplete set is based on asynchronous retrieval of the keys, the entire data store does not need to be scanned during every attempt, which reduces the latency of each attempt. Latency can also be kept low since updating an incomplete set within the data store does not necessarily require a large number of computationally expensive database operations to tables (e.g., insert, update, lookup, delete operations) or overhead associated with some database transactions such as locking, format versioning, or metadata activities. For example, an updated set of records can be appended to a file of the data store, and the index is updated to locate that most recently updated version of the set of records, without having to delete the old version at the time of the update.

The structure of the data store and the data structure (called a "hold queue") can be optimized based on size and access speed demands. An incomplete set of records stored in the data store may require a relatively large amount of storage space in a large capacity storage device (e.g., non-volatile storage). Instead of requiring the entire contents of the records in an incomplete set to be added to the hold queue, a potentially much smaller amount of information, including a key identifying an incomplete set, is added to the hold queue. If the contents of the incomplete set are later updated in the data store, the same key in the hold queue can still be used to process the updated version. In some cases, the hold queue is small enough to fit into relatively faster memory (e.g., volatile memory). The hold queue ensures that a set of one or more records that does not match to expected records in a reasonable amount of time can "time out" based on an expiration criterion (which may depend on the completeness or incompleteness of the set). Keys can be retrieved from the hold queue asynchronously with the matching procedure attempts and/or with a lower frequency. The frequency of retrieval of keys from the hold queue can be tuned based on a desired trade-off between latency and completeness.

Other features and advantages of the invention will become apparent from the following description, and from the claims.

DESCRIPTION

Figure 1:
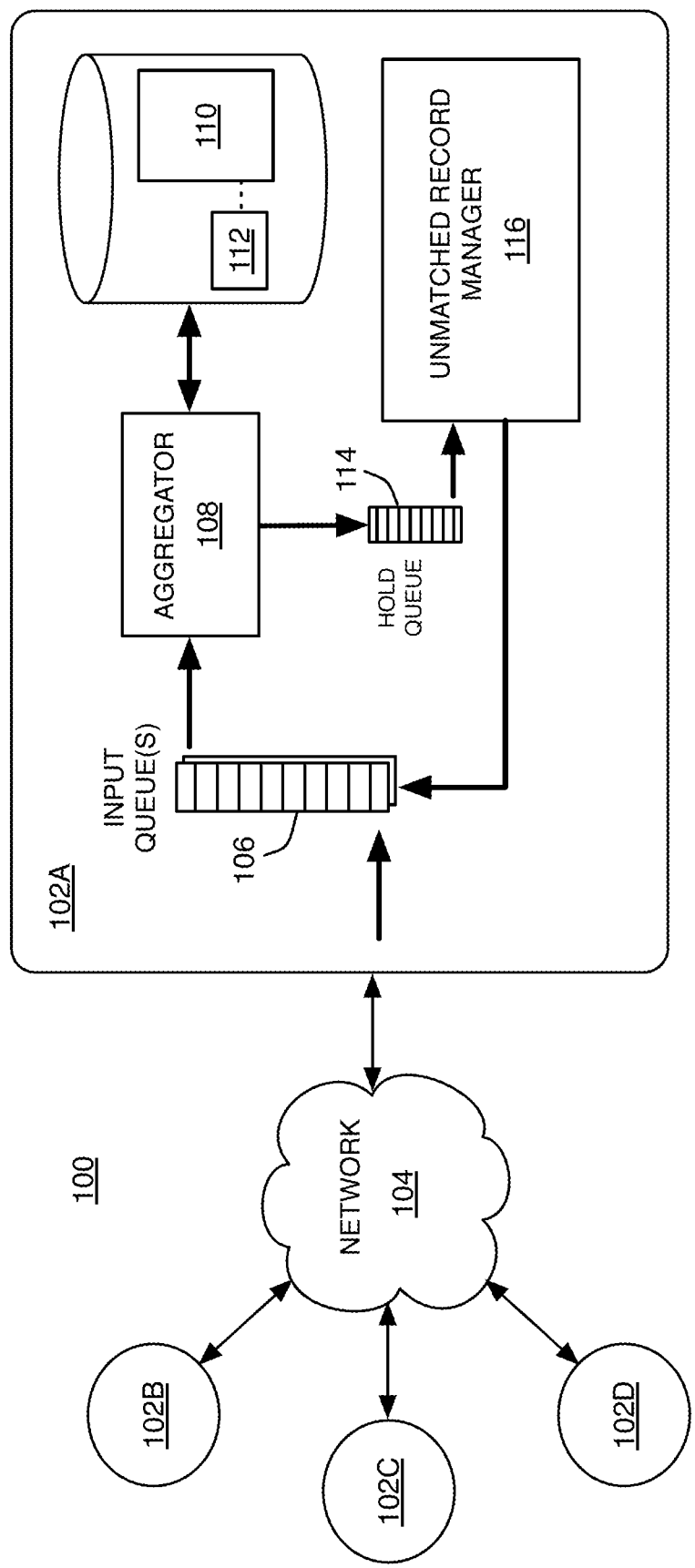
FIG. 1 is a block diagram of a mediation system.

FIG. 1 shows an example of a mediation system 100 in which the aggregation techniques can be used. The system 100 includes a node 102A coupled to a network 104. The node 102A includes a network interface 106 over which the node 102A communicates with other nodes 102B-102D in the network 104. The node 102A also provides an execution environment in which the node 102A aggregates data from the network and provides processed result data, which may then be sent to a downstream system in communication with the node 102A or used to initiate subsequent actions at the node 102A. The execution environment may be hosted on one or more general-purpose computers under the control of a suitable operating system, such as the UNIX operating system. For example, the execution environment can include a parallel computing environment including a configuration of computer systems using multiple central processing units (CPUs), either local (e.g., multiprocessor systems such as SMP computers), or locally distributed (e.g., multiple processors coupled as clusters or MPPs), or remote, or remotely distributed (e.g., multiple processors coupled via a local area network (LAN) and/or wide-area network (WAN)), or any combination thereof.

The node 102A includes an input buffer 106 that receives incoming data from one or more sources in the network (e.g., other nodes). The incoming data can include individual records. Different types of records can be received from corresponding streams or feeds, or the records can be received from a single stream or feed. The input buffer 106 can use any of a variety of data storage techniques including files or data structures such as queues stored in memory (e.g., volatile memory), or inter-process communication mechanisms such as named pipes or sockets. For example, the input buffer 106 can include one or more input queues, and can be organized such that records of different types are added to different respective queues, or such that the records are added to a single queue. The records may be processed (e.g., reformatted) after they are received or after they have been read from the input buffer 106. The processing can include adding a timestamp to the record, which can be used for testing an expiration criterion, described in more detail below. The records can also be verified to detect an errors or missing data (e.g., verifying that the fields containing identifiers to be used for matching are present and not empty).

In some implementations, the received records are divided into units of work corresponding to records received during respective intervals of time. The intervals can be configurable, for example, in terms of a predetermined number of records or a predetermined amount of time (e.g., every 2 minutes) based on a clock at the node 102A. One technique for dividing a flow of records into units of work is described in U.S. Pat. No. 6,654,907, entitled "Continuous Flow Compute Pont Based Data Processing," incorporated herein by reference. Various other activities may also be performed in each time interval or after a predetermined multiple of the time intervals. For example, a checkpoint interval can be specified in which data associated with the mediation activities that have been received or generated since a previous checkpoint interval is persistently stored (e.g., for recovery in the event of a failure).

An aggregator 108 receives records from the input buffer 106 and attempts a matching procedure on the records in a unit of work. The aggregator 108 compares identifiers associated with different records to gather a set of records associated with a particular event (e.g., a phone call). For example, in some cases the identifier is a global call ID that is either included within a record or can be assigned to a record based on other information in the record that can be mapped to a particular global call ID. The aggregator 108 compares identifiers of the records in the unit of work with each other to find matches, and determines whether there are any records previously stored in a data store 110 having the same identifier as any of the records in the unit of work. The data store 110 provides persistent storage in a non-volatile storage device, which can be accessed using an index 112, as described in more detail below. The use of the index 112 or other lookup technique (e.g., a hash-based lookup) enables the aggregator 108 to search for particular identifiers without having to scan the entire data store 110 on every attempt of the matching procedure (i.e., random access). For each distinct identifier represented in the records in the unit of work, the aggregator 108 determines whether or not a completeness criterion is satisfied for the set of records associated with that identifier. After an aggregated set satisfies a particular completeness criterion, or after a certain amount of time (according to an expiration criterion), the node 102A processes the aggregated set and provides processed result data, for example, by sending the aggregated set of records to the downstream system. The node 102A also stores information in the data store 110 identifying any stored records associated with the identifier of the aggregated set as having been processed.

If there are any incomplete sets of one or more records for which the completeness criterion was not satisfied during the attempt of the matching procedure, the node 102A stores the incomplete set (or information contained in the records in the incomplete set) in the data store 110, indexed according to the associated identifier. The node 102A also stores keys corresponding to the incomplete sets of records in a hold queue 114 (e.g., a First-In-First-Out (FIFO) queue) that is separate from the data store 110. The key uniquely identifies an incomplete set. An entry in the hold queue 114, called a "key record" can simply be the key itself or a compact record including the key and a small amount of other relevant information. In some implementations, the keys are the same as the identifiers used for aggregating the set of records, or have a one-to-one correspondence to the identifiers. In some implementations, instead of using a FIFO queue, the information in the key records is recorded in a data structure that is stored in the same storage medium (e.g., a hard drive) or the same storage system (e.g., a database) as the data store 110, with entries in the data structure (e.g., index entries) indicating the status of each record or set of records.

An example of a completeness criterion is the following. In this example, the sources of records include various nodes in the network. A Gateway node sends a stream of CDRs including Start CDRs associated with the beginning of a phone call, and Stop CDRs associated with the termination of a phone call. A Routing node also sends a stream including Start CDRs and Stop CDRs associated with the same phone calls. A Quality Monitoring node sends a stream of call quality metric records associated with the same phone calls. The completeness criterion specifies a complete set of records for a particular call as including: a pair of Start and Stop Routing CDRs, a pair of Start and Stop Gateway CDRs, and a call quality metric record. Each of these records is associated with the same identifier that corresponds to a particular phone call. There may be other records sent from the nodes that are not part of the completeness criterion (e.g., Attempt CDRs associated with attempted phone calls for which a connection was not completed). Such records may be sent to the downstream system without being delayed for potential matching.

An unmatched record manager 116 manages retrieval of stored key records, removing them from the hold queue 114 and adding them to the input buffer 106, so that the aggregator 108 is able to attempt the matching procedure on the corresponding records in the data store 110 along with other records received in the same unit of work. While it is true that the matching procedure would have been attempted on an incomplete set of records when the missing expected records arrived, this retrieval process managed by the unmatched record manager 116 enables an incomplete set to be repeatedly tested against an expiration criterion. For example, the expiration criterion may specify that as long as an incomplete set includes both matched pairs of Start and Stop CDRs and is only missing a call quality metric record, the incomplete set of records can be sent to the downstream system and indicated as processed in the data store 110 after first predetermined time limit (e.g., 10 minutes). The expiration criterion may also specify that an incomplete set of records can be sent to the downstream system and indicated as processed in the data store 110 no matter what expected records are missing after second predetermined time limit (e.g., 30 minutes). Thus, in this example, the expiration criterion depends on the degree of incompleteness of the incomplete set of records. The manager 116 can use the time at which the first record in the set was read from the input buffer 106 (e.g., based on a timestamp in the record) relative to the current time (e.g., based on a local clock), when comparing an incomplete set of records with these time limits. If an expected record is received after an incomplete set has already been sent, the expected record can be discarded or can be sent to the downstream system anyway as a late update.

By tuning the frequency of retrieval of key records from the hold queue 114 independently of the frequency of the time intervals that define a unit of work, a desired trade-off between latency and completeness can be achieved. The aggregator 108 and the manager 116 can be controlled by two separate processes that operate independently, for example. In some cases, a relatively large delay in processing incomplete sets of records may be acceptable, in which case the manager 116 can retrieve key records at a relatively low frequency compared to the time intervals that define a unit of work (e.g., every 100 units of work), or at a particular frequency that is asynchronous with the time intervals (e.g., every 10 minutes). The number of key records that are retrieved from the hold queue 114 at a time can also be tuned, anywhere from the single (least recently stored) key record to all of the stored key records. In some implementations, any duplicate key records retrieved from the hold queue 114 are identified and eliminated. If fewer than all of the key records are retrieved, there may be one instance of a key record that is removed from the hold queue 114 and another instance of the key record still remaining in the hold queue 114. In such cases, both instances of the key record may be checked by the aggregator 108 (in different respective time intervals). If the first key record resulted in the corresponding set of records being sent downstream (e.g., because an expiration criterion was met) then the set will be indicated as processed in the data store 110 when the matching procedure is attempted on the second key record.

Figure 2:
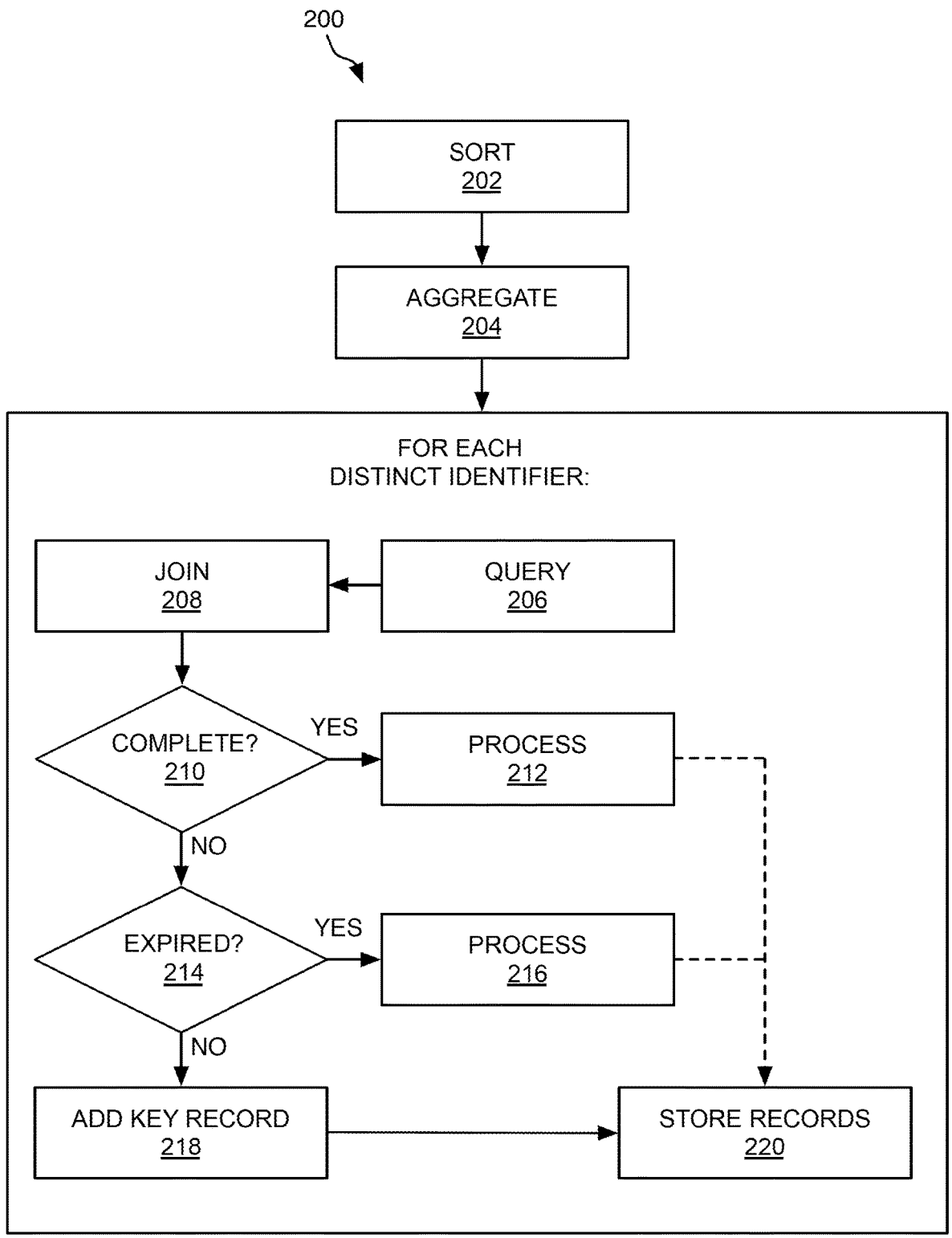
FIG. 2 is a flowchart of an example of a matching procedure.

FIG. 2 shows a flowchart of an example of a matching procedure 200 performed by the aggregator 108. The aggregator 108 sorts 202 records from the input buffer 106 that were received in the most recent time interval (the current unit of work). The records are sorted by the identifier that will be used for the matching procedure 200. The aggregator 108 determines distinct identifiers associated with the received records by aggregating 204 the sorted records such that there is one aggregated set of records for each distinct identifier. An aggregated set of records that share the same distinct identifier can be combined into a single record (e.g., a record that includes a vector of other records, or another type data structure that holds information from multiple records). Some of the records from the input buffer 106 may be key records that were added by the unmatched record manager 116 (and in some cases may be flagged as having a different format than the newly received full records in the unit of work). These key records are sorted and aggregated along with the full records to find distinct identifiers that will be used in the next stage of the matching procedure 200. In some implementations, the sorting 202 and the aggregating 204 are performed together in an in-memory hashing technique.

For each distinct identifier found in the records of the most recent unit of work, the aggregator 108 performs a query 206 of the data store 110 by looking up the identifier in the index 112 and retrieving any records stored in the data store 110 indexed by that identifier. If there is any set of stored records that have the same identifier and that are not indicated as already having been processed, then the aggregator 108 retrieves them and joins 208 them with the aggregated set of received records that corresponds to that identifier. Alternatively, in other examples, the sorting 202 and aggregating 204 can be performed after the query 206 of the data store 110, however, for incoming data streams in which records with the same identifier arrive close in time, this example may improve performance by reducing the number of queries to the data store 110 that are performed.

The aggregator 108 determines whether the attempt of the matching procedure 200 has been successful for each aggregated/joined set of records by determining 210 whether or not the completeness criterion is satisfied for that set of records. If the completeness criterion is satisfied, the aggregator 108 processes 212 that complete set of records and updates the data store 110 to indicate that set of records as having been processed. If the completeness criterion is not satisfied for that set of records, the aggregator 108 checks 214 the expiration criterion. If the incomplete set of records has expired, then the aggregator 108 processes 216 that set of records and updates the data store 110 to indicate that set of records as having been processed. If the incomplete set of records has not expired, then the aggregator 108 adds 218 a key record for the incomplete set of records to the hold queue 114 and, if necessary, stores 220 an initial or updated version of the incomplete set of records in the data store 110 indexed by the identifier (which may be identical to the key or uniquely determined based on the key). In some implementations of the data store 110, it is not necessary to remove any old versions of the same incomplete set of records because the most recent version will be accessed when the index 112 is checked. In some implementations, the aggregator 108 also stores 220 an initial or updated version of a complete or expired set of records in the data store 110 so that there is an up-to-date historical record of the set of records that was processed. In some implementations, there is no expiration criterion and for any set of records for which the completeness criterion is not satisfied, the aggregator 108 adds 218 a key record to the hold queue 114.

The data store 110 can be implemented using any of a variety of techniques for quickly writing data to a location that can be efficiently accessed using an index. For example, records can be sequentially written to a file, with an index storing a pointer to the location at which the records with a particular identifier were written. In order to allow for fast updates, a new version of an incomplete set of records can be appended to the end of the file, without having to immediately remove the old version. To manage the size of the data store 110, multiple files can be written and old files that store only records that have already been processed can be deleted after some time limit (e.g., an hour, or a day). The data store 110 can also use compression to reduce the amount of space used. Removing old files also ensures that the identifier can be recycled without having inconsistencies. One example of a technique that has these properties is the compound compressed record file described in U.S. Pat. No. 7,885,932, incorporated herein by reference. Each compressed record file in a compound compressed record file includes multiple compressed blocks, where each block stores records having an identifier that falls in a particular range. The location of each block is indexed, and when a set of records with a particular identifier is being retrieved, only a single block needs to be decompressed and only a limited number of records need to be searched. Also, compressing multiple records together provides a greater compression ratio than compressing individual records.

In some implementations, certain records can be stored in the hold queue 114 instead of in the data store 110 without significantly affecting the size or efficiency of access to the hold queue 114. For example, there may be some records that cannot be associated with a particular identifier until they have been aggregated with another record. In such cases the full record maybe added to the hold queue 114 and not added to the data store 110. After the full record has been aggregated and assigned an identifier, it may then need to be stored in the data store 110 until its aggregated set is completed and processed. If this initial aggregation occurs in a short time frame, full records are unlikely to remain in the hold queue 114 for very long.

In some implementations, multiple aggregators 108 may be cascaded to perform different matching processes on the incoming records using different types of identifiers. Each aggregator may use its own data store 110 and its own hold queue 114, or they may share a single data store 110 and hold queue 114 as long as the identifiers and keys for the two aggregators can be distinguished. For example, the data store 110 can be indexed on multiple types of identifiers that come from different fields of a record, and either type of identifier can be looked up in the index 112 to locate a set of records in the data store 110.

The aggregation approach described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of dataflow graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer, or delivered (encoded in a propagated signal) over a communication medium of a network to a storage medium of the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A method for processing data, the method including:
receiving records over a network interface from one or more sources in a telecommunications network at a node external to the telecommunications network and coupled to the telecommunications network, at least some of the records each being associated with an identifier;
for each of multiple intervals of time, attempting, at the node external to the telecommunications network, a matching procedure on one or more of the received records, the matching procedure including comparing identifiers associated with the one or more of the received records and with one or more previously stored records written to a data store to generate sets of records, and determining whether a completeness criterion is satisfied for one or more of the sets of records;
for at least one of the intervals of time, processing, at the node external to the telecommunications network, a first set of records, for which the completeness criterion is satisfied during an associated current matching attempt, the processing the first set of records including processing an aggregation, where the aggregation includes: (1) the one or more of the received records on which the matching procedure is first attempted during the interval of time, and (2) one or more records stored in the data store before the interval of time that are retrieved from the data store using a key that is stored in a data structure separate from the data store; and for the at least one of the intervals of time, processing, at the node external to the telecommunications network, a second set of records, for which the completeness criterion was unsatisfied during a previous matching attempt and for which the completeness criterion is unsatisfied in the associated current attempt, upon determining that a predetermined time limit has passed since at least one record from the second set of records was received at the external node, wherein determining that the predetermined time limit has passed includes determining that the completeness criterion is unsatisfied for the second set of records in the current attempt, and testing the second set of records against criteria specifying two or more different degrees of incompleteness associated with respective predetermined time limits representative of relative periods that passed since the at least one record from the second set of records was received at the node, wherein the second set of records includes one or more previously received records received at the node prior to the current matching attempt, and stored in the data store at the node during the previous matching attempt upon a previous determination that the completeness criterion was unsatisfied at the previous matching attempt for the second set of records.

2. The method of claim 1, further including:
after at least some attempts of the matching procedure, storing in the data store at least some incomplete sets of records for which the completeness criterion was not satisfied during that attempt, and storing keys used to uniquely identify the incomplete sets of records in a data structure separate from the data store; and
retrieving stored keys from the data structure to attempt the matching procedure on corresponding records during a subsequent interval of time.

3. The method of claim 2, wherein the intervals of time define a unit of work in terms of a predetermined number of records or a predetermined amount of time, and the stored keys are retrieved from the data structure asynchronously with the intervals of time.

4. The method of claim 2, wherein comparing the identifiers associated with the one or more of the received records and with the one or more previously stored records written to the data store to generate the sets of records, and determining whether the completeness criterion is satisfied for the one or more of the sets of records includes:
determining distinct identifiers associated with the one or more of the received records,
for each distinct identifier, retrieving any records stored in the data store associated with that distinct identifier, and aggregating a set of records associated with that identifier that includes the one or more of the received records and any retrieved records, and
determining whether the completeness criterion is satisfied for each aggregated set of records.

5. The method of claim 4, wherein retrieving any records stored in the data store associated with that distinct identifier includes: looking up the distinct identifier in an index associated with the data store.

6. The method of claim 5, wherein retrieving any records stored in the data store associated with that distinct identifier includes: decompressing a portion of the data store that includes any records associated with the distinct identifier.

7. The method of claim 6, wherein retrieving any records stored in the data store associated with that distinct identifier includes: scanning the decompressed portion of the data store to locate any records associated with the distinct identifier.

8. The method of claim 4, wherein retrieving any records stored in the data store associated with that distinct identifier includes: determining whether a stored set of records associated with that distinct identifier has been identified as having been processed.

9. The method of claim 4, wherein retrieving any records stored in the data store associated with that distinct identifier includes: determining a hash value based on the distinct identifier.

10. The method of claim 2, wherein receiving records from one or more sources in the network includes storing the received records in an input buffer.

11. The method of claim 1, further including, for one or more of the intervals of time, processing at least one complete set of records, and storing in the data store information identifying the processed complete set of records as having been processed.

12. The method of claim 1, further including, for one or more of the intervals of time, processing at least one incomplete set of records, and storing in the data store information identifying the processed incomplete set of records as having been processed.

13. The method of claim 1, further including, after at least an initial attempt of the matching procedure is attempted on a first incomplete set of records during a first interval of time, and after at least a second attempt of the matching procedure is attempted on the first incomplete set of records during a second interval of time, comparing a time associated with at least one record in the first incomplete set of records with an expiration criterion, and processing the first incomplete set of records in response to the comparison of the time associated with at least one record in the incomplete set of records with the expiration criterion.

14. The method of claim 1, wherein the key associated with a set of records includes the identifier associated with the set of records.

15. The method of claim 1, wherein the intervals of time are determined based on a clock at the node.

16. The method of claim 1, wherein the intervals of time are determined based on a number of records received.

17. The method of claim 1, wherein one or more of the intervals of time are included within a checkpoint interval in which data associated with the matching procedure that has been received or generated since a previous checkpoint interval is persistently stored.

18. The method of claim 1, wherein the data store enables random access of records stored in the data store.

19. The method of claim 1, wherein processing a set of records includes sending information in the records in the set to another node in the network.

20. The method of claim 1, wherein
the key that is stored in the data structure separate from the data store uniquely identifies an incomplete set of records containing the one or more records stored in the data store before the interval of time.

21. The method of claim 20, wherein the data structure has a relatively faster access speed than the data store.

22. The method of claim 21, wherein the data store includes a non-volatile storage device, and the data structure includes a volatile memory.

23. The method of claim 1, wherein determining whether the completeness criterion is satisfied for the one or more of the sets includes determining a degree to which information associated with a particular set of one or more records satisfies the completeness criterion.

24. The method of claim 1, wherein processing the second set of records comprises processing the second set of records, for which the completeness criterion is not satisfied during the associated current matching attempt, in response to a determination that at least part of the completeness criterion and an expiration criterion are satisfied for the second set of records, where the second set of records includes one or more records stored in the data store before the interval of time.

25. The method of claim 24, wherein processing the second set of records in response to the determination that at least part of the completeness criterion and the expiration criterion are satisfied for the second set of records comprises processing the second set of records based on a degree of incompleteness of the second set of records at different times following a time instance, represented by a timestamp, associated with the second set of records.

26. The method of claim 1, wherein processing the second set of records includes processing the second set of records if the predetermined time limit has passed since the at least one record from the second set was received at the node in the network and content of the second set of records satisfies a degree of incompleteness of the two or more different degrees of incompleteness that is based on the predetermined time limit.

27. The method of claim 26, further including storing the second set of records at the node, in response to a determination that the content of the second set of records does not satisfy the degree of incompleteness of the two or more different degrees of incompleteness based on the predetermined time limit, and performing a subsequent matching procedure on the second set of records at a subsequent interval of time to determine if a second predetermined time has passed since the at least one record from the second set was received at the node, and the content of the second set of records at the subsequent interval of time satisfies a subsequent degree of incompleteness that is based on the second predetermined time limit.

28. The method of claim 1, wherein determining that the predetermined time limit has passed further includes:
determining that the second set of records has a current degree of incompleteness satisfying one of the two or more different degrees of incompleteness, specified in the criteria, corresponding to a relative time period that has passed since the first record of the second set of records was received at the node.

29. The method of claim 1, wherein a first degree of incompleteness, specified in the criteria specifying the two or more different degrees of incompleteness, that is associated with the previous matching attempt is lower than a second degree of incompleteness associated with the current matching attempt.

30. A non-transitory computer-readable medium storing a computer program for processing data, the computer program including instructions for causing a computing system to:
receive records over a network interface from one or more sources in a telecommunications network at a node external to the telecommunications network and coupled to the telecommunications network, at least some of the records each being associated with an identifier;
for each of multiple intervals of time, attempt, at the node external to the telecommunications network, a matching procedure on one or more of the received records, the matching procedure including comparing identifiers associated with the one or more of the received records and with one or more previously stored records written to a data store to generate sets of records, and determining whether a completeness criterion is satisfied for one or more of the sets of records;
for at least one of the intervals of time, process, at the node external to the telecommunications network, a first set of records, for which the completeness criterion is satisfied during an associated current matching attempt, the processing the first set of records including processing an aggregation, where the aggregation includes: (1) the one or more of the received records on which the matching procedure is first attempted during the interval of time, and (2) one or more records stored in the data store before the interval of time that are retrieved from the data store using a key that is stored in a data structure separate from the data store; and
for the at least one of the intervals of time, process, at the node external to the telecommunications network, a second set of records, for which the completeness criterion was unsatisfied during a previous matching attempt and for which the completeness criterion is unsatisfied in the associated current attempt, upon determining that a predetermined time limit has passed since at least one record from the second set of records was received at the external node, wherein determining that the predetermined time limit has passed includes determining that the completeness criterion is unsatisfied for the second set of records in the current attempt, and testing the second set of records against criteria specifying two or more different degrees of incompleteness associated with respective predetermined time limits representative of relative periods that passed since the at least one record from the second set of records was received at the node, wherein the second set of records includes one or more previously received records received at the node prior to the current matching attempt, and stored in the data store at the node during the previous matching attempt upon a previous determination that the completeness criterion was unsatisfied at the previous matching attempt for the second set of records.

31. The non-transitory computer-readable medium of claim 30, wherein the processing further includes:
after at least some attempts of the matching procedure, storing in the data store at least some incomplete sets of records for which the completeness criterion was not satisfied during that attempt, and storing keys used to uniquely identify the incomplete sets of records in a data structure separate from the data store; and
retrieving stored keys from the data structure to attempt the matching procedure on corresponding records during a subsequent interval of time.

32. The non-transitory computer-readable medium of claim 31, wherein the intervals of time define a unit of work in terms of a predetermined number of records or a predetermined amount of time, and the stored keys are retrieved from the data structure asynchronously with the intervals of time.

33. The non-transitory computer-readable medium of claim 31, wherein comparing the identifiers associated with the one or more of the received records and with the one or more previously stored records written to the data store to generate the sets of records, and determining whether the completeness criterion is satisfied for the one or more of the sets of records includes:

determining distinct identifiers associated with the one or more of the received records, for each distinct identifier, retrieving any records stored in the data store associated with that distinct identifier, and aggregating a set of records associated with that identifier that includes the one or more of the received records and any retrieved records, and determining whether the completeness criterion is satisfied for each aggregated set of records.

34. The non-transitory computer-readable medium of claim 30, wherein the processing further includes: after at least an initial attempt of the matching procedure is attempted on a first incomplete set of records during a first interval of time, and after at least a second attempt of the matching procedure is attempted on the first incomplete set of records during a second interval of time, comparing a time associated with at least one record in the first incomplete set of records with an expiration criterion, and processing the first incomplete set of records in response to the comparison of the time associated with at least one record in the incomplete set of records with the expiration criterion.

35. The non-transitory computer-readable medium of claim 34, wherein retrieving any records stored in the data store associated with that distinct identifier includes: looking up the distinct identifier in an index associated with the data store.

36. The non-transitory computer-readable medium of claim 35, wherein retrieving any records stored in the data store associated with that distinct identifier includes: decompressing a portion of the data store that includes any records associated with the distinct identifier.

37. The non-transitory computer-readable medium of claim 36, wherein retrieving any records stored in the data store associated with that distinct identifier includes: scanning the decompressed portion of the data store to locate any records associated with the distinct identifier.

38. The non-transitory computer-readable medium of claim 34, wherein retrieving any records stored in the data store associated with that distinct identifier includes: determining whether a stored set of records associated with that distinct identifier has been identified as having been processed.

39. The non-transitory computer-readable medium of claim 30, wherein one or more of the intervals of time are included within a checkpoint interval in which data associated with the matching procedure that has been received or generated since a previous checkpoint interval is persistently stored.

40. A network node, including:
a network interface configured to receive records from one or more sources in a telecommunications network, at least some of the records each being associated with an identifier, wherein the network node is external to the telecommunications network and coupled to the telecommunications network; and
at least one processor configured to process sets of records, the processing including:
for each of multiple intervals of time, attempting, at the network node external to the telecommunications network, a matching procedure on one or more of the received records, the matching procedure including comparing identifiers associated with the one or more of the received records and with one or more previously stored records written to a data store to generate sets of records, and determining whether a completeness criterion is satisfied for one or more of the sets of records;

for at least one of the intervals of time, processing, at the network node external to the telecommunications network, a first set of records, for which the completeness criterion is satisfied during an associated current matching attempt, the processing the first set of records including processing, an aggregation, where the aggregation includes: (1) the one or more of the received records on which the matching procedure is first attempted during the interval of time, and (2) one or more records stored in the data store before the interval of time that are retrieved from the data store using a key that is stored in a data structure separate from the data store; and for the at least one of the intervals of time, processing, at the network node external to the telecommunications network, a second set of records, for which the completeness criterion was unsatisfied during a previous matching attempt and for which the completeness criterion is unsatisfied in the associated current attempt, upon determining that a predetermined time limit has passed since at least one record from the second set of records was received at the external network node, wherein determining that the predetermined time limit has passed includes determining that the completeness criterion is unsatisfied for the second set of records in the current attempt, and testing the second set of records against criteria specifying two or more different degrees of incompleteness associated with respective predetermined time limits representative of relative periods that passed since the at least one record from the second set of records was received at the network node, wherein the second set of records includes one or more previously received records received at the node prior to the current matching attempt, and stored in the data store at the node during the previous matching attempt upon a previous determination that the completeness criterion was unsatisfied at the previous matching attempt for the second set of records.

41. The network node of claim 40, wherein the processing further includes:
after at least some attempts of the matching procedure, storing in the data store at least some incomplete sets of records for which the completeness criterion was not satisfied during that attempt, and storing keys used to uniquely identify the incomplete sets of records in a data structure separate from the data store; and
retrieving stored keys from the data structure to attempt the matching procedure on corresponding records during a subsequent interval of time.

42. The network node of claim 41, wherein the intervals of time define a unit of work in terms of a predetermined number of records or a predetermined amount of time, and the stored keys are retrieved from the data structure asynchronously with the intervals of time.

43. The network node of claim 41, wherein comparing the identifiers associated with the one or more of the received records and with the one or more previously stored records written to the data store to generate the sets of records, and determining whether the completeness criterion is satisfied for the one or more of the sets of records includes:
determining distinct identifiers associated with the one or more of the received records,
for each distinct identifier, retrieving any records stored in the data store associated with that distinct identifier, and aggregating a set of records associated with that identifier that includes the one or more of the received records and any retrieved records, and determining whether the completeness criterion is satisfied for each aggregated set of records.

44. The network node of claim 40, wherein the processing further includes: after at least an initial attempt of the matching procedure is attempted on a first incomplete set of records during a first interval of time, and after at least a second attempt of the matching procedure is attempted on the first incomplete set of records during a second interval of time, comparing a time associated with at least one record in the first incomplete set of records with an expiration criterion, and processing the first incomplete set of records in response to the comparison of the time associated with at least one record in the incomplete set of records with the expiration criterion.

45. The network node of claim 44, wherein retrieving any records stored in the data store associated with that distinct identifier includes: looking up the distinct identifier in an index associated with the data store.

46. The network node of claim 45, wherein retrieving any records stored in the data store associated with that distinct identifier includes: decompressing a portion of the data store that includes any records associated with the distinct identifier.

47. The network node of claim 46, wherein retrieving any records stored in the data store associated with that distinct identifier includes: scanning the decompressed portion of the data store to locate any records associated with the distinct identifier.

48. The network node of claim 44, wherein retrieving any records stored in the data store associated with that distinct identifier includes: determining whether a stored set of records associated with that distinct identifier has been identified as having been processed.

49. The network node of claim 40, wherein one or more of the intervals of time are included within a checkpoint interval in which data associated with the matching procedure that has been received or generated since a previous checkpoint interval is persistently stored.

50. A network node, including:
communication hardware for receiving records over a network interface from one or more sources in a telecommunications network, at least some of the records each being associated with an identifier, wherein the network node is external to the telecommunications network and coupled to the telecommunications network; and
a hardware-based computing device for processing sets of records, the processing including:
for each of multiple intervals of time, attempting, at the network node external to the telecommunications network, a matching procedure on one or more of the received records, the matching procedure including comparing identifiers associated with the one or more of the received records and with one or more previously stored records written to a data store to generate sets of records, and determining whether a completeness criterion is satisfied for one or more of the sets of records;
for at least one of the intervals of time, processing, at the network node external to the telecommunications network, a first set of records, for which the completeness criterion is satisfied during an associated current matching attempt, the processing the first set of records including processing an aggregation, where the aggregation includes: (1) the one or more of the received records on which the matching procedure is first attempted during the interval of time, and (2) one or more records stored in the data store before the interval of time that are retrieved from the data store using a key that is stored in a data structure separate from the data store; and
for the at least one of the intervals of time, processing, at the network node external to the telecommunications network, a second set of records, for which the completeness criterion was unsatisfied during a previous matching attempt and for which the completeness criterion is unsatisfied in the associated current attempt, upon determining that a predetermined time limit has passed since at least one record from the second set of records was received at the external network node, wherein determining that the predetermined time limit has passed includes determining that the completeness criterion is unsatisfied for the second set of records in the current attempt, and testing the second set of records against criteria specifying two or more different degrees of incompleteness associated with respective predetermined time limits representative of relative periods that passed since the at least one record from the second set of records was received at the network node, wherein the second set of records includes one or more previously received records received at the node prior to the current matching attempt, and stored in the data store at the node during the previous matching attempt upon a previous determination that the completeness criterion was unsatisfied at the previous matching attempt for the second set of records.

* * * * *